United States Patent [19]

Tsukahara et al.

[11] Patent Number: 4,745,026

[45] Date of Patent: May 17, 1988

[54] THERMAL DELAYED TACK SHEETS

[75] Inventors: Hirokazu Tsukahara, Kanamachi; Nobuhiro Kagota, Tokyo; Masashi Yoda, Zushi, all of Japan

[73] Assignee: Mitsubishi Paper Mills, Ltd., Tokyo, Japan

[21] Appl. No.: 21,393

[22] Filed: Mar. 3, 1987

[30] Foreign Application Priority Data

| Mar. 3, 1986 | [JP] | Japan | 61-46822 |
| Mar. 13, 1986 | [JP] | Japan | 61-56157 |
| Apr. 10, 1986 | [JP] | Japan | 61-83326 |
| Apr. 11, 1986 | [JP] | Japan | 61-83873 |
| Apr. 24, 1986 | [JP] | Japan | 61-95977 |

[51] Int. Cl.$^4$ .................. B32B 5/16; B32B 27/06; C09J 7/02

[52] U.S. Cl. .................. 428/323; 428/423.1; 428/349; 428/913

[58] Field of Search .................. 428/327, 423.1, 349, 428/913, 323

[56] References Cited

U.S. PATENT DOCUMENTS 4,581,294 4/1986 Geist .................. 428/423.1 X
4,585,819 4/1986 Reischle et al. .................. 428/423.1 X Primary Examiner—Thomas J. Herbert
Attorney, Agent, or Firm—Saidman, Sterne, Kessler and Goldstein

[57] ABSTRACT

Thermal delayed tack sheet prepared by coating a base sheet with a thermal delayed tack composition containing an adhesive polymer, a solid plasticizer, and preferably a tackifier, which plasticizers are fine particle solid compound(s) at room temperature.

15 Claims, No Drawings

THERMAL DELAYED TACK SHEETS

BACKGROUND OF THE INVENTION (1) Field of the Invention

The present invention relates to thermal delayed tack sheets which are non-tacky at ordinary temperature but which will show tackiness, when activated by heating and which can retain the tackiness for a certain period of time, even after a heat source has been taken off therefrom.

(2) Description of the Prior Art

Thermal delayed tack sheets are also called temperature-sensitive tack papers, and are described in, for example, "Adhesion Handbook", Polymer Publication Association, 12th Edition, Sept. 20, 1980. The thermal delayed tack sheets are sheets each having a coating layer composed basically of a polymeric material, i.e., an adhesive polymer, a plasticizer which is solid at room temperature and preferably a tackifier. Examples of the above mentioned polymeric materials include polyvinyl acetate, polybutyl methacrylate, vinyl chloride/vinylidene chloride copolymer, synthetic rubbers, vinyl acetate/2-ethylhexyl acrylate copolymer, vinyl acetate/ethylene copolymer, vinylpyrrolidone/styrene copolymer, styrene/butadiene copolymer and vinylpyrrolidone/ethyl acrylate copolymer. Examples of the above mentioned solid plasticizers include diphenyl phthalate, dihexyl phthalate, dicyclohexyl phthalate, dihydroabietyl phthalate, dimethyl isophthalate, sucrose benzoate, ethylene glycol dibenzoate, trimethylolethane tribenzoate, glyceride tribenzoate, pentaerythritol tetrabezoate, sucrose octaacetate, tricyclohexyl citrate, N-cyclohexyl-p-toluenesulfonamide, dehydroabietylamine carbonate and methoxyethyl stearate/urea complex. Examples of the tackifier include rosin derivatives (rosins, polymerized rosins, hydrogenated rosins and their esters with glycerine or pentaerythritol and the like, resin acid dimers and the like), terpene resins, petroleum resins, phenolic resins and xylene resins.

The polymeric material is the base of the adhesive and tack strength, and is called the adhesive polymer. The tackifier is an auxiliary component for increasing tackiness, when activated by heating, and it is preferably blended but is not an essential ingredient.

The solid plasticizer is solid at room temperature and thus does not provide the polymeric material with plasticizing properties at such a temperature level, but when heated, it will be melted, whereby the polymeric material will swell and melt, and will consequently show tackiness. After once melted, the plasticizer will crystallize slowly, and therefore, a tack retention time of the tack sheets after heat activation can be prolonged.

Further, a coating solution for the manufacture of the thermal delayed tack sheets can take the form a hot melt type where a tacky composition is heated and thereby melted and is then used for coating (e.g., Japanese Laid Open Patent Nos. 16055/1980 and 106984/1981), an organic solvent type where components are dissolved in an organic solvent and used for coating, and the organic solvent is then evaporated (e.g., Japanese Laid Open Patent No. 111246/1976), or an aqueous type emulsion with coating solution where an latex and water is used for coating and then dried (Souichi Muroi, "Polymer Latex Adhesive", Polymer Publication Association, June 10, 1984).

SUMMARY OF THE INVENTION

The present inventors have found from repeated experiments that the adhesion and tack retention (retention time) of thermal delayed tack sheets depends largely upon the kind of not only adhesive polymer but also plasticizer and that the most excellent one of the conventional plasticizers is not on the level at which the tack retention is satisfactory. In consequence, a first object of the present invention is to solve the problem of the conventional technique that, in particular, after the thermal delayed tack composition has been thermally activated, its adhesion and tack retention time is not long enough.

When the tack sheets are applied onto articles to be tacked, particularly onto articles made from a material such as a plastic having low polarity, it can be presumed that the tack sheets adhere to the articles by the aid of their tackiness for a certain period of time. Therefore, if the tackiness has been lost, the tack sheets will prematurely peel from the articles, which fact will remarkably impair the practical value of the tack sheets. For this reason, if the adhesion and tack retention time after the thermal activation is prolonged to an enough degree, the thermal delayed tack sheets which are excellent in adhesive and tacky properties for the plastics can be obtained.

Accordingly, a second object of the present invention is to provide thermal delayed tack sheets which can exhibit sufficient adhesion and tack retention properties even to articles made from a material having low polarity such as a plastic and which therefore will not peel off therefrom prematurely.

Further, the tack sheets before thermal activation has the drawback that blocking will be apt to occur during their manufacturing step or storage. That is, when the thermal delayed tack sheets are stacked in the form of a wound roll or a sheet, particularly when they are stored at a slightly high temperature and pressure for a long time, they will adhere to each other on occasion. This phenomenon is called the so-called blocking. In consequence, a third object of the present invention is to provide thermal delayed tack sheets in which no blocking will occur.

When a hot melt type or an organic solvent type is takes the form of a composition (coating solution) in which an adhesive polymer, a solid plasticizer and a tackifier are blended, the solid plasticizer will be melted by heat or an organic solvent. Thus, the plasticizer on the sheets immediately after applied is in an activated state and in a tacky state. If it is intended to render the plasticizer non-tacky, it is necessary to wait for the recrystallization of the solid plasticizer, which fact requires an additional process of allowing it to stand for a long period of time. This is a problem in manufacturing the tack sheets.

Therefore, a fourth object of the present invention is to manufacture thermal delayed tack sheets which requires no employment of specific base sheets coated with a release agent in manufacturing them and which is not in danger of any blocking, even when directly wound up immediately after coating.

The present inventors have conducted a variety of research to solve the above mentioned problems and have found that the adhesion and tack retention (retention time) of the thermal delayed tack sheets depends largely upon a kind of not only adhesive polymer but also plasticizer and that the plasticizer should be solid at room temperature to provide the adhesive polymer with no plasticity and to thereby prevent its blocking during manufacturing and storing tack seets. On the basis of these found facts, additional research has have been continued, seeking for a new organic material which has a satisfactory retention time and which is a solid plasticizer at room temperature and can exhibit tackiness only when heated. As a result, the present invention has now been completed.

That is, the present invention is directed to thermal delayed tack sheets prepared by coating base sheets with a thermal delayed tack composition basically containing an adhesive polymer (A) and a solid plasticizer (B), and preferably further containing a tackifier (C), the thermal delayed tack sheets being characterized in that the solid plasticizer is employed which comprises fine particles of one or more selected from the compounds represented by the following general formula (I):

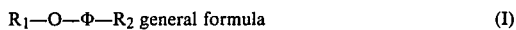

$R_1-O-\Phi-R_2$ general formula (I)

wherein $\Phi$ is a benzene ring or a naphthalene ring which may have a substituent, $R_1$ is a hydrogen atom, an acyl radical, an alkylsulfonyl radical or a benzenesulfonyl radical which may have a substituent on the benzene ring thereof, $R_2$ is a group of $-O-CO-R_3$ or $-CO-O-R_3$, and $R_3$ is a radical selected from the group consisting of an alkyl radical, an alkenyl radical, an aralkyl radical, an aralkenyl radical and an aryl radical, and when $R_1$ takes the hydrogen atom, positions of 1 and 2, 1 and 3, or 1 and 4 on the ring of the $\Phi$ may be substitued by $-O-R_1$ and $-R_2$, and in the other cases, the positions of 1 and 2 on the ring may be substitued.

The symbols in the general formula just described will represent the identical meanings hereinafter.

The compounds represented by the general formula (I) can be classified into four categories, and preferable compounds in each category will be described in detail. In the first place, the solid plasticizers which are recommendable are esters of aromatic carboxylic acids each having a phenolic hydroxyl radical. They can be represented by the following structural formula (II):

$HO-\Phi-COOR_4$ structural formula (II)

wherein $\Phi$ is a benzene ring or a naphthalene ring which may have a substituent, and $R_4$ is a radical selected from the group consisting of an alkyl radical, a cycloalkyl radical, an alkenyl radical, an aralkyl radical (whose aromatic ring may have a substituent) and a phenyl radical.

No literature can be found anywhere in which it is written down that these compounds are useful for the thermal delayed tack sheets. Concrete examples in this category are as follows:

Phenyl salicylate, methyl metahydroxybenzoate, ethyl metahydroxybenzoate, phenyl metahydroxybenzoate, methyl parahydroxybenzoate, ethyl parahydroxybenzoate, n-propyl parahydroxybenzoate, isopropyl parahydroxybenzoate, n-butyl parahydroxybenzoate, isobutyl parahydroxybenzoate, sec-butyl parahydroxybenzoate, n-heptyl parahydroxybenzoate, stearyl parahydroxybenzoate, cyclohexyl parahydroxybenzoate, allyl parahydroxybenzoate, benzyl parahydroxybenzoate, $\beta$-phenylethyl parahydroxybenzoate, 4-chlorobenzyl parahydroxybenzoate, 4-methylbenzyl parahydroxybenzoate, phenyl 1-hydroxy-2-naphthoate, methyl 2-hydroxy-3-naphthoate, ethyl 2-hydroxy-3-naphthoate, phenyl 2-hydroxy-3-naphthoate, dimethyl 4-hydroxyphthalate, diethyl 4-hydroxyphthalate, di-n-propyl 4-hydroxyphthalate, diisopropyl 4-hydroxyphthalate, dibenzyl 4-hydroxyphthalate, dicyclohexyl 4-hydroxyphthalate, dimethyl 2-hydroxyisophthalate, diethyl 2-hydroxyisophthalate, diphenyl 2-hydroxyisophthalate, dimethyl 4-hydroxyisophthalate, diethyl 4-hydroxyisophthalate, diethyl 5-hydroxyisophthalate and dimethyl hydroxyterephthalate. The above mentioned solid plasticizer comprises fine particles of one or more selected from the compounds just mentioned. These compounds for the plasticizer are actually colorless crystals which are solid at room temperature, and they have inherent melting points. When heated up to a temperature higher than the melting point, each compound will melt and become liquid, and they will function as an effective plasticizer for a polymer which is present in the vicinity thereof, in order to provide the thermal delayed tack sheets with tackiness.

Each compound for the plasticizer can be synthesized by adding an alcohol to a corresponding hydroxy-substituted aromatic carboxylic acid and then performing an esterification in the presence of an acid catalyst. One or more of these solid compounds may be used in a thermal delayed tack composition. Needless to say, also by using the above compound together with a known solid plasticizer, good results can be obtained. In this case, it is preferred that the solid plasticizer regarding the present invention is employed in an amount of 30% by weight or more.

Next, new preferable solid plasticizers which the present invention provides are dicarboxylates of catechol. Such esters can be represented by the following structural formula (III):

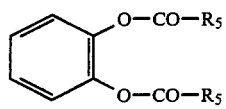

structural formula (III)

wherein $R_5$ is a radical selected from the group consisting of an alkyl radical, an alkenyl radical, a cycloalkyl radical, an aralkyl radical, an aralkenyl radical and an aryl radical.

No literature can be found anywhere in which it is written down that these diesters are useful as plasticizers for polymers. The present inventors have confirmed that dicarboxylates of parahydroquinone which are structural isomers of the above esters show no function of the plasticizer at all. Typical compounds of the catechol dicarboxylates are as follows:

Catechol diacetate, catechol dilaurate, catechol dimyristate, catechol distearate, catechol dieicosanic acid ester, catechol dicyclohexanecarboxylate, catechol dibenzoate, catechol diphenylacetate and catechol dicinnamate. Each catechol dicarboxylate could be synthesized with ease by adding 2 moles or more of a carboxylic anhydride or a carboxylic acid halide to 1 mole of catechol and then preferably heating the resulting mixture or adding thereto a base. All of the synthesized products were actually colorless solids (crystals).

One or more catechol dicarboxylates may each be employed together with a known solid plasticizer. In this case, it is preferred that the plasticizer regarding the present invention is employed in an amount of 30% by weight or more.

Further, other solid plasticizers which the present invention provides are 2-acyloxybenzoates represented by the following structural formula (IV):

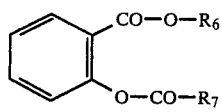

structural formula (IV)

wherein each of $R_6$ and $R_7$ is a radical selected from the group consisting of an alkyl radical, a cycloalkyl radical an alkenyl radical, an aralkyl radical or an aryl radical. The aromatic rings of the aralkyl radical and the aryl radical may have substituents. Further, the main aromatic ring may also have a substituent selected from the group consisting of an alkyl radical, an aryl radical and halogen atoms.

No literature can be found anywhere in which it is written down that these ester compounds are useful as plasticizers especially in a thermal delayed tack composition.

The present inventors have confirmed that 4-acyloxybenzoates which are structural isomers of the above esters show no function of the plasticizer particularly in the thermal delayed tack composition. One or more of these plasticizers may be used in a thermal delayed tack composition. Needless to say, also by using the above plasticizer together with a known solid plasticizer, good results can be obtained. In this case, it is preferred that the solid plasticizer regarding the present invention is employed in an amount of 30% by weight or more. Preferable typical compounds of 2-acyloxybenzoates of this type are as follows:

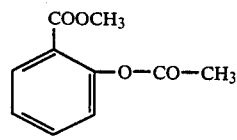 (a)

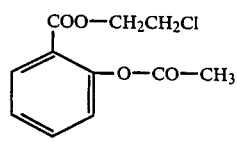 (b)

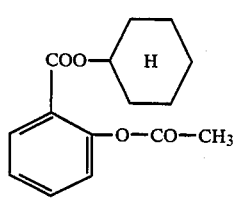 (c)

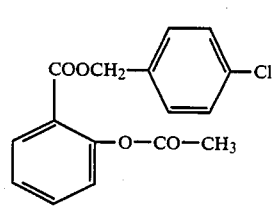 (d)

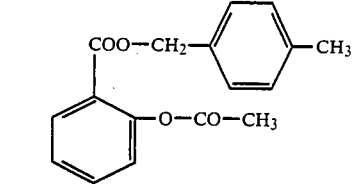 (e)

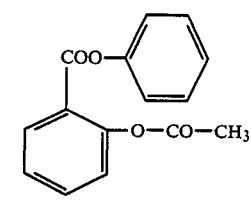 (f)

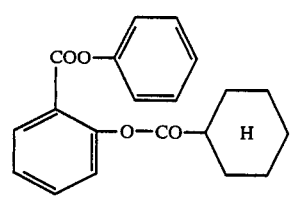 (g)

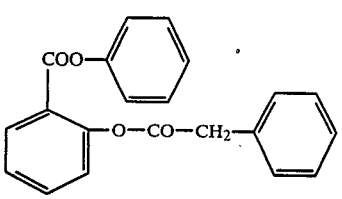 (h)

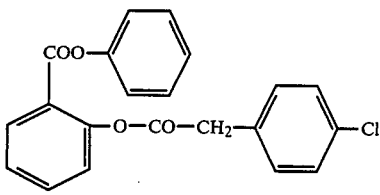 (i)

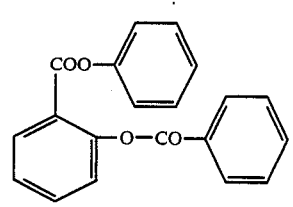 (j)

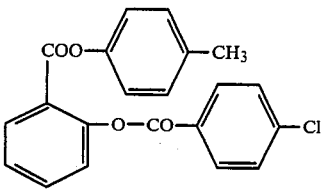 (k)

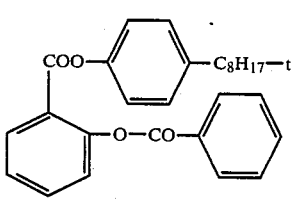 (l)

-continued (m) 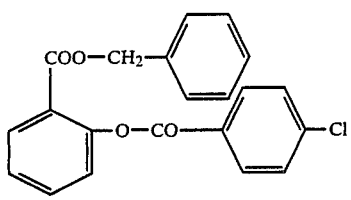

(n) 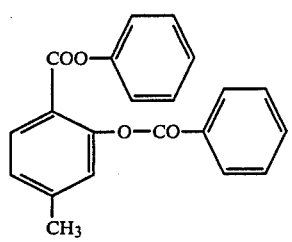

(o) 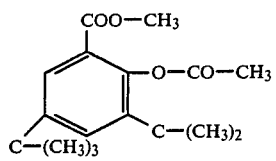

(p) 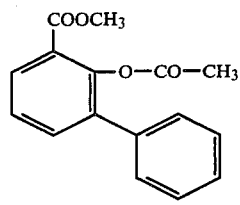

(q) 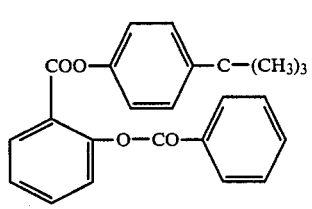

Each 2-acyloxybenzoate compound of present invention could be synthesized by reacting salicylic acid with an alcohol or a phenol in order to esterify a carboxyl radical in the presence of an acid catalyst and then reacting the resulting ester with a carboxylic anhydride or a halide to acylate a hydroxyl radical. The synthesized products all were essentially colorless solids (crystals).

Furthermore, other preferable solid plasticizers which the present invention provides are 2-sulfonyloxybenzoate compounds represented by the following structural formula (V):

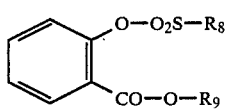

structural formula (V)

wherein $R_8$ is an alkyl radical, an aralkyl radical or an aryl radical (whose aromatic ring may have a substituent), $R_9$ is an alkyl radical, a cycloalkyl radical, an alkenyl radical, an aralkyl radical or an aryl radical, and aromatic rings of the aralkyl and aryl radicals may have substituents.

Of plasticizers of this type, preferable typical compounds are as follows:

(a) 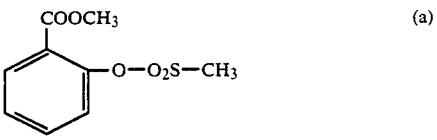

(b) 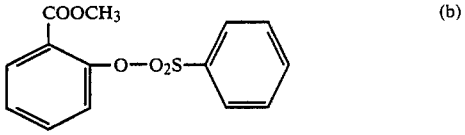

(c) 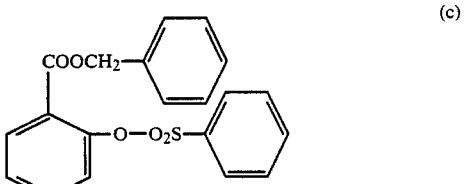

(d) 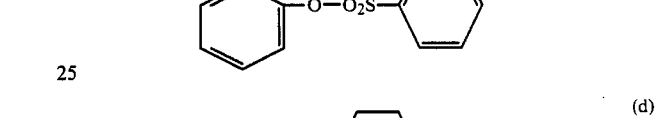

(e) 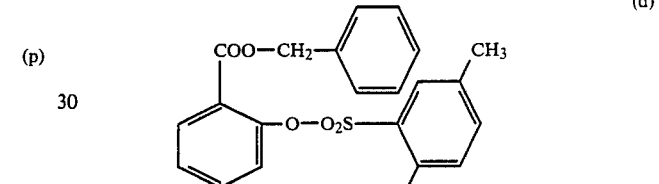

(f) 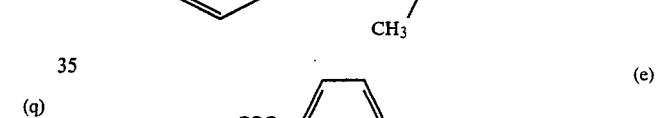

(g) 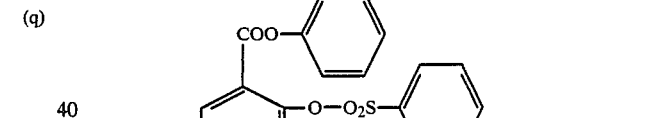

(h) 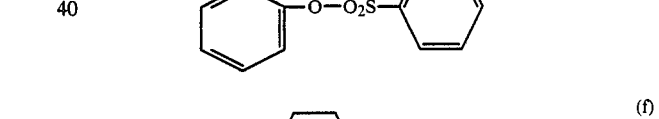

-continued (i) 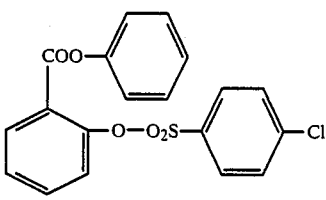

(j) 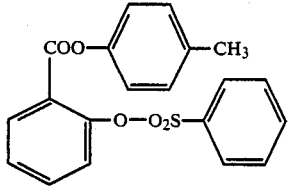

(k) 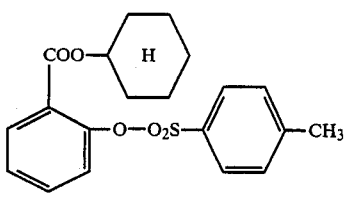

(l) 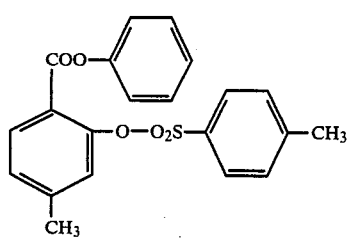

(m) 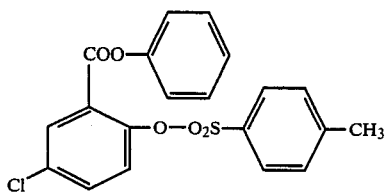

(n) 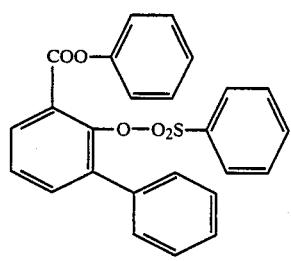

(o) 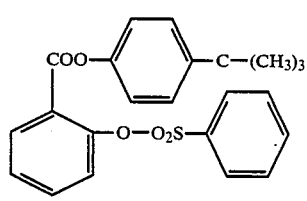

Each ester compound of 2-sulfonyloxybenzoic acid could be synthesized, in a known manner, by first reacting salicylic acid with an alcohol or a phenol to esterify a carboxyl radical in the presence of an acid catalyst and then performing a reaction with a halide of a sulfonic acid in the presence of alkali to replace a hydroxyl radical with a sulfonyl radical. The thus synthesized products all were essentially colorless solids (crystals).

No literature can be found anywhere in which the 2-sulfonyloxybenzoates are useful as solid plasticizers especially in a thermal delayed tack composition. The present inventors have confirmed that 4-sulfonyloxybenzoates which are structural isomers of the above esters show no plasticizer function at all.

One or more of these solid plasticizers may be used having different chemical structures. Needless to say, also by using the above plasticizer together with a known solid plasticizer, good results can be obtained. In this case, it is preferred that the solid plasticizer regarding the present invention is employed in an amount of 30% by weight or more.

DESCRIPTION OF THE PREFERRED EMBODIMENTS

With regard to a blend ratio of the adhesive polymer, the solid plasticizer and the tackifier to be preferably added which are components of the thermal delayed composition, the solid plasticizer fine particles are from 50 to 300 parts by weight and the tackifier is from 10 to 120 parts by weight based on 100 parts by weight of the adhesive polymer.

When an amount of the solid plasticizer is less than 50 parts by weight, its tackiness by the heat activation will be difficult to appear; when it is more than 300 parts by weight, a cohesion of the tack portion after the heat activation will be poor, and the tack retention time (open time) after the heat activation will be short. Therefore, amounts of the plasticizer outside of the above given range are not practical.

When an amount of the tackifier is less than 10 parts by weight, the adhesion and tack strength of the sheet after the heat activation will be low; when it is more than 120 parts by weight, the blocking phenomenon will occur remarkably in the case that the sheet is wound up in the form of a roll.

As the adhesive polymers, there can be used the known polymers which have been mentioned hereinbefore. However, in order to retain the adhesion and tack properties for an enough period of time even on articles having low polarity which have been made from, e.g., plastic materials, and additionally in order to inhibit the blocking phenomenon of the tack sheets, even when they are wound immediately after coating the base sheets with the tack composition in manufacturing the tack sheets, the present inventors have found that it is effective and beneficial to employ a polyurethane for a part or all of the adhesive polymer. An amount of the polyurethane to be added is within the range of from 50 to 100% by weight based on that of the adhesive polymer.

When an amount of the polyurethane is less than 50% by weight, it will be insufficient to increase the plastic material in the adhesion and tack properties, and in addition thereto, the tackiness of the sheets will be high, after the coating step in manufacturing the tack sheets, with the result that the blocking phenomenon will be liable to occur, when they are stacked up.

The polyurethane is preferably used in the form of a polyurethane emulsion and in a manner of aqueous coating, when the thermal delayed tack sheets are manufactured. The polyurethane emulsions can be classified into a polyether series, a polyester series, an aromatic isocyanate series, and an aliphatic isocyanate series and the like in accordance with a used material, but all the series are utilizable in the present invention. The raw material of the resin, the molecular weight of the polymer and the like can be selected in view of an intended use of the tack sheets, conditions (heating temperature and heating time) of the heat activation, sticking condition (sticking pressure, time necessary for sticking, material quality and morphology of articles to be tacked) and the like.

In order to finely control tack properties (adhesive force, tack strength, cohesive force and the like) to the various articles to be tacked, anti-blocking properties and the like, the adhesive polymer may be used together with the polyurethane emulsion. As such adhesive polymers, emulsions of the conventionally known adhesive polymers mentioned above may be employed, but preferable examples thereof include vinyl acetate series copolymers (e.g., vinyl acetate/ethylene copolymers) and acrylic series copolymers (e.g., styrene/acrylic ester copolymers).

As the tackifiers, conventionally known ones can be used, but preferable examples thereof include esterified compounds of glycerol or pentaerythritol and the like with rosins having a softening point of 90° to 130° C. or polymerized rosins.

For the purpose of manufacturing the thermal delayed tack sheets which are not liable to bring about the blocking phenomenon, even without using particular base sheets coated with a release agent and even when the sheets are wound up immediately after the base sheets have been coated with the tack composition, the present inventors have chosen the manner of preparing an aqueous coating solution in which the respective components of the tack composition are emulsified or dispersed, whereby the plasticizer which is solid at room temperature can be applied in a fine particle solid state. And the present inventor have found that by drying the coated sheets at a temperature of a melting point or less of the solid plasticizer, i.e., by taking drying conditions under which the tack sheets are not thermally activated, the thermal delayed tack sheets can be directly manufactured which bring about no blocking, even when wound up in a roll form. According to such a procedure, the plasticizer capable of displaying the tackiness of the adhesive polymer is maintained in a fine particle solid state so as to prevent the adhesive polymer from being activated, and in consequence, the blocking phenomenon can be inhibited.

Each size, i.e, diameter of the fine particles comprising the solid plasticizer should be within the range in which the practical and commercial value of the tack sheets can be kept from the viewpoints of roughness, appearance, powder fall and the like, and thus, the particle size thereof is 30 micrometers or less, preferably 20 micrometers or less, more preferably 10 micrometers or less in terms of an average diameter (50% volume mean particle diameter).

Since the solid plasticizer of the present invention is an organic compound, its pulverization is much easier than in the case of a metal or an inorganic compound, and a variety of pulverizing methods can be utilized. However, a dry process for the pulverization involves temperature rise during pulverizing, difficulty of handling a pulverized powder and annoyance of dispersing the powder into water. On the contrary, a wet process for the pulverization is convenient and superior, because of not having such troubles and enabling the pulverized powder to be dispersed simultaneously into water.

For the wet pulverization, there can be utilized usual means such as a homogenizer, a warring blender, a ball mill and an attritor.

A particle diameter distribution curve of the fine particle suspension was usually one peak curve which was similar to a binominal distribution, and it did not show any strange distribution curves.

The thermal delayed tack sheets are primarily required to exhibit the tackiness by being heated, and for this requirement, the plasticizer contained in the thermal delayed tack composition must have the effect of sufficiently swelling and dissolving of the adhesive polymer. Further, a storage stability, particularly non-tackiness retention properties under non-heating conditions are practically important for the thermal delayed tack sheets. That is, the thermal delayed tack sheets must satisfy the requirements for anti-blocking properties.

The necessary anti-blocking properties depend upon conditions at the times of the manufacture, storage, transportation, treatment, printing and actual use of the thermal delayed tack sheets, and the occurrence of the blocking can be confirmed by the adhesion between the sheets themselves under the influence of a circumferential temperature and pressure and by a sound caused when the wound sheets are unwounded and when the heaped sheets are separated from each other.

In particular, it is desired that the thermal delayed tack sheets have a great tolerance for circumferential conditions such as a little higher temperature and pressure than ordinary situations, since in practice, they are inevitably exposed to such slightly severe conditions.

In short, the above mentioned anti-blocking properties of the tack sheets are connected with their temperature-sensitive properties and must be thus improved, maintaining their adhesion and tackiness properties at a good level. In the end, it is to be appreciated that the chemical material, i.e., the fine particle solid plasticizer, which is essentially most sensitive to a temperature, contributes most greatly to the anti-blocking properties. The solid plasticizer has an inherent melting point and decomposition point. Therefore, a temperature at which the thermal delayed tack composition exhibits its tackiness (a temperature for thermal activation) depends upon the melting or decomposition point of this solid plasticizer. In consequence, it is desired that the melting and decomposition points of the solid plasticizer are within the allowable ranges and that the allowable anti-blocking temperature range of the plasticizer is as extensive as possible.

The solid plasticizer which the present invention stipulates can satisfy these requirements.

The usable tackifiers include rosin derivatives (rosin, polymerized rosins, hydrogenated rosins and their esters with glycerin, pentaerythritol and the like, resin acid dimers and the like), terpene resin, coumarone-indene resin, petroleum resin, phenolic resin series, xylene resin series and the like. However, in order to perform such an aqueous coating as described above, it is preferable to make use of emulsifiable ones among the above mentioned compounds.

Also with regard to the adhesive polymers, it is preferred that the emulsifiable ones are employed.

As means for the aqueous coating operation, there can be used a roll coater, an air-knife coater, a blade coater, a gravure coater and the like which are not uncommon, and a coating weight is preferably within the range of 10 to 30 g/cm² in terms of a dry solid content.

The drying operation is carried out at a temperature at or below the melting point of the solid plasticizer used, as described above.

EXAMPLES

The present invention will be described in accordance with examples and comparative examples, but needless to say, they do not intend to limit the scope of the present invention.

In the examples and the comparative examples, every "part" means "part by weight of solid content".

EXAMPLE 1

The following raw materials were blended to prepare an aqueous coating solution (solid content=50%):

| | |
|---|---|
| Polyurethane emulsion | 100 parts |
| (Izerax S-1020; Hodogaya Chemical Co., Ltd.) | |
| Aqueous dispersion of catechol dibenzoate | 100 parts |
| Rosin ester emulsion | 50 parts |

An art paper having a basis weight of 80 g/m² was coated on either surface thereof with the thus prepared aqueous coating solution so that a dry coating weight might be 15 g/m², followed by drying it at 50° C. for 2 minutes in order to prepare a non-adhesive coated paper.

EXAMPLE 2

The following raw materials were blended to prepare an aqueous coating solution (solid content=50%):

| | |
|---|---|
| Polyurethane emulsion | 60 parts |
| (the same as in Example 1) | |
| Styrene/acrylic ester copolymer emulsion | 40 parts |
| Catechol dicyclohexanecarboxylate aqueous dispersion | 150 parts |
| Polymerized rosin ester emulsion | 30 parts |

An art paper having a basis weight of 80 g/m² was coated on either surface thereof with the thus prepared aqueous coating solution so that a dry coating weight might be 20 g/m², followed by drying it at 50° C. for 2 minutes in order to prepare a non-adhesive coated paper.

COMPARATIVE EXAMPLE 1

The following raw materials were blended to prepare an aqueous coating solution (solid content=50%):

| | |
|---|---|
| Styrene/acrylic ester copolymer emulsion | 100 parts |
| (the same as in Example 2) | |
| Dicyclohexyl phthalate aqueous dispersion | 150 parts |
| Polymerized rosin ester emulsion | 30 parts |

An art paper having a basis weight of 80 g/m² was coated on either surface thereof with the thus prepared aqueous coating solution so that a dry coating weight might be 20 g/m², following by drying it at 50° C. for 2 minutes in order to prepare a non-adhesive coated paper.

EXAMPLE 3

The coated paper prepared in Examples 1 and 2 as well as Comparative Example 1 were activated under heating conditions at 120° C. for 30 seconds, and were applied onto the wall of a polypropylene bottle. The latter onto which the respective papers were applied was allowed to stand at room temperature for a period of one week, and a peel test was then carried out. According to the obtained results, the applied samples of the coated papers in Examples 1 and 2 showed strong adhesion and tack properties, but the applied sample of the coated paper in Comparative Example 1 was peeled off easily from the bottle.

COMPARATIVE EXAMPLE 2

The following raw materials were dissolved in 200 parts of toluene:

| | |
|---|---|
| Styrene/isoprene copolymer | 100 parts |
| Dicyclohexyl phthalate | 200 parts |
| Terpene resin | 30 parts |

An art paper having a basis weight of 80 g/m² was coated on either surface thereof with the resulting coating solution so that a dry coating weight might be 20 g/m², followed by drying it at 100° C. for 2 minutes in order to prepare a coated paper. However, the coated surface of this paper was too adhesive, and therefore, the paper caused completely blocked when stacked.

EXAMPLE 4

Out of solid plasticizers having the sturctural formula (II) used in the present invention, 11 species were chosen which were shown in Table 1 given below, and the following materials were then mixed:

| | |
|---|---|
| Solid plasticizer | 50 parts |
| Polyvinyl alcohol | 3 parts |
| Nonionic active agent | 3 parts |

To the resulting mixture, water was added so that a concentration of the plasticizer might be 25%, and the plasticizer in the mixture was then wet-pulverized to fine particles by the use of a ball mill, thereby preparing an aqueous suspension.

Next, the following materials were mixed:

| | |
|---|---|
| Styrene/acrylic ester copolymer | 5.0 parts |
| Vinyl acetate/ethylene copolymer | 5.0 parts |
| Solid plasticizer suspension | 16 parts |
| Rosin ester | 2.5 parts |

To the resulting mixture, water was added so as to prepare an aqueous coating solution of the total solid content concentration being 50%.

An art paper having a basis weight of 80 g/m² was coated on the either surface thereof with each coating solution so that a dry coating weight might be 20 g/m², followed by drying it at room temperature, whereby coated papers which were all non-adhesive were obtained. These coated papers were then heated for 30 seconds in a thermostatic chamber at 150° C. so as to accomplish their activation, and immediately after the heating, tackiness degrees were evaluated by means of the inclined ball tack method (temperature=20° C. and inclindation angle=30°).

The results in Table 1 indicate that the compositions to which hydroxy substituted aromatic carboxylate compounds are added can exhibit remarkable tack.

TABLE 1

Examples of aromatic carboxylates having phenolic hydroxyl radicals.

| Solid Plasticizer | Melting Point | Ball tack (ball number) |
| --- | --- | --- |
| Phenyl salicylate | 44° C. | 5 |
| Ethyl metahydroxybenzoate | 73° C. | 6 |
| Methyl parahydroxybenzoate | 126° C. | 5 |
| Ethyl parahydroxybenzoate | 117° C. | 7 |
| Isopropyl parahydroxybenzoate | 86° C. | 8 |
| n-Butyl parahydroxybenzoate | 72° C. | 6 |
| Isobutyl parahydroxybenzoate | 76° C. | 9 |
| Benzyl parahyroxybenzoate | 111° C. | 7 |
| Allyl parahydroxybenzoate | 105° C. | 7 |
| Methyl 2-hydroxy-3-naphthoate | 75° C. | 5 |
| Dimethyl 4-hydroxyphthalate | 105° C. | 7 |
| Blank | (no tack) | <2 |

EXAMPLE 5

Out of the plasticizers having the structural formula (II) used in the present invention, isobutyl parahydroxybenzoate (melting point=76° C.) and dicyclohexyl phthalate (melting point=65° C.) were chosen as the solid plasticizers, and an aqueous suspension of their fine particles was prepared in the same manner as in Example 4.

Next, the following materials were mixed:

| | |
| --- | --- |
| Ethylene/vinyl acetate copolymer emulsion | 100 parts |
| Solid plasticizer suspension | 150 parts |
| Polymerized rosin/polyalcohol ester emulsion | 50 parts |

To the resulting mixture, water was added so as to prepare an aqueous coating solution of the total solid content concentration being 50%.

An art paper having a basis weight of 80 g/m² was coated on the either surface thereof with each coating solution, and was then dried at 40° C. A coating weight after drying was 20 g/m² in both the cases.

These paper pieces were activated at 120° C. for 20 seconds and were then allowed to stand at room temperature. After one week, the tacky surfaces of the paper pieces were observed. According to the results obtained, in the comparative sample, crystallization was clearly advanced and tackiness was not so perceptible by a hand finger. On the other hand, in the sample regarding the present invention, no crystallization was observed and tackiness was highly felt.

The samples activated under the above mentioned conditions were immediately applied onto the wall of a polypropylene bottle. The latter onto which the respective papers were applied was allowed to stand at room temperature for a period of one week, and a peel test was then carried out by a fingernail. According to the obtained results, in the case of the sample regarding the present invention, peeling was difficult, but with regard to the sample of the comparative sample, it was peeled off therefrom with ease. That is, in the sample of the present invention, it was confirmed that the noticeable improvement in tackiness was achieved.

EXAMPLE 6

(synthetic example of catechol dicyclohexanecarboxylate)

To 11.0 parts of catechol, 35.2 parts of cyclohexanecarbonyl chloride was added, and 40 parts of pyridine was then added dropwise thereto with stirring. Heating was carried out with a reflux condenser on an oil bath for one hour, and afterward a large amount of water was added thereto and the resulting mixture was then stirred under ice cooling, so that a crystal appeared.

The obtained crystal was afterward separated out and dried, and it was further recrystallized in n-hexane in order to deposit a colorless needle crystal. The yield of the product was 25.1 parts (yield ratio=76%), the melting point was 59° C., and the ratio of m/Z by an mass analysis (the FD method) was 330 (calculated value: $C_{20}H_{26}O_4 = 330.42$).

Other catechol dicarboxylates could also be synthesized by a similar method.

EXAMPLE 7

As solid plasticizers, there were selected known dicyclohexyl phthalate, diphenyl phthalate and dimethyl isophthalate for comparison with catechol dicarboxylate, and hydroquinone dicyclohexanecarboxylate similar to the plasticizer of the present invention, and the following experiments were made.

In the first place, the following materials were mixed:

| | |
| --- | --- |
| Solid plasticizer | 100 parts |
| Polyvinyl alcohol | 7 parts |
| Nonion surface active agent | 7 parts |

Water was then added to the resulting mixture so that the total solid content concentration might be 50%. Afterward, the solid plasticizer in the mixture was pulverized by means of a ball mill to prepare an aqueous suspension of solid plasticizer fine particles.

Next, the following materials were mixed:

| | |
| --- | --- |
| Ethylene/vinyl acetate compolymer emulsion | 10 parts |
| Acrylic copolymer emulsion | 10 parts |
| Solid plasticizer suspension | 40 parts |
| Rosin ester emulsion | 5 parts |

Water was then added to the resulting mixture so as to prepare an aqueous coating solution of the total solid content concentration being 50%.

An art paper having a basis weight of 100 g/m² was coated on the either surface thereof with each coating solution so that a dry coating weight might be 20 g/m², followed by drying it at room temperature, whereby coated papers which were all non-adhesive were obtained.

These coated papers were then heated for 30 seconds in a thermostatic chamber at 150° C. so as to accomplish their activation, and tackiness degrees were evaluated by means of the inclined ball tack method (temperature in the measuring chamber=20° C. and inclination angle=30°). The results are set forth in Table 2.

TABLE 2

Examples of catechol dicarboxylates.

| Test No. | Plasticizer | Melting Point | Ball Tack |
|---|---|---|---|
| 1 | Catechol diacetate | 65° C. | 9 |
| 2 | Catechol dicyclohexane-carboxylate | 59° C. | 7 |
| 3 | Catechol dibenzoate | 86° C. | 5 |
| 4 | Catechol diphenylacetate | 76° C. | 6 |
| 5 | Dicyclohexyl phthalate | 65° C. | 5 |
| 6 | Diphenyl phthalate | 75° C. | 4 |
| 7 | Dimethyl isophthalate | 68° C. | <2 (no tack) |
| 8 | Hydroquinone dicyclohexane-carboxylate | 140° C. | <2 (no tack) |
| 9 | Blank | | <2 (no tack) |

Note:
The samples of Test Nos. 1 to 4 were within the present invention, and the samples of Test Nos. 5 and 9 were without the present invention.

As set forth in Table 2, the novel plasticizers of the present invention, after heated, can display noticeable tackiness in the thermal delayed tack compositions.

In the above described tests, the tack degress, i.e., the tackiness alone was inspected. In consequence, Test Nos. 3 and 5 showed the same results of "ball tack =5", but it is apparent that the tackiness of the catechol dibenzoate was much higher than that of the dicyclohexyl phthalate, as definitely shown in Example 9.

EXAMPLE 8

As solid plasticizers, catechol dibenzoate of the present invention and diphenyl phthalate for comparison were employed, and aqueous suspensions of solid plasticizer fine particles were prepared by the same procedure as in Example 7. Afterward, the following materials were mixed:

| | |
|---|---|
| Styrene/acrylic ester copolymer emulsion | 25 parts |
| Solid plasticizer suspension | 35 parts |
| Rosin ester emulsion | 10 parts |

Water was then added thereto so as to prepare an aqueous coating solution of the total solid content concentration being 50%.

An art paper having a basis weight of 80 g/m² was coated on the either surface thereof with each coating solution so that a dry coating weight might be 20 g/m², followed by drying it at 40° C., whereby two thermal delayed tack sheets which were non-adhesive at room temperature were obtained.

They were heated at 150° C. for 30 seconds to activate them, and the thus treated sheets exhibited similar adhesion and tack properties.

For the purpose of inspecting blocking properties between the sheets themselves, the latter were superposed on each other so that the obverse of one sheet might be confronted by the reverse of the other sheet, and a weight of 1 kg/cm² was put thereon. They were allowed to stand at a circumferential temperature of 55° C. for 30 minutes, followed by inspecting the blocking properties.

In the case of the comparative example in which diphenyl phthalate was used as the solid plasticizer, when the adhered sheets were separated off, blocking was observed, and in addition a big sound was caused.

On the other hand, as for the example of the present invention in which catechol dibenzoate was used, no blocking was observed in practice and little sound occurred.

That is, in the example of the present invention, it was confirmed that a definite improvement in blocking properties was achieved.

EXAMPLE 9

As solid plasticizers, there were chosen catechol dibenzoate regarding the present invention and known dicyclohexyl phthalate, and aqueous suspensions of their fine particles were prepared in the same manner as in Example 7. Next, the following materials were mixed:

| | |
|---|---|
| Ethylene/vinylacetate copolymer emulsion | 100 parts |
| Catachol dibenzoate suspension | 50 parts |
| Dicyclohexyl phthalate suspension | 100 parts |
| Terpen resin emulsion | 50 parts |

Water was then added thereto so as to prepare an aqueous coating solution of the total solid content concentration being 50%

For comparison, the same procedure as described above was repeated with the exception that catachol dibenzoate was not used, in other words, dicyclohexyl phthalate alone was employed in an amount of 150 parts as the solid plasticizer, so that another aqueous coating solution was prepared.

An art paper having a basis weight of 80 g/m² was coated on the either surface thereof with each coating solution. The weight of the dried coating was 20 g/m² in both the cases.

These sheets were cut into a strip shape and were then activated at 120° C. for 20 seconds. They were afterward applied onto a polyehylene film and were allowed to stand at room temperature for one month.

Afterward, the sample sheets were peeled off from the polyethylene sheet by a fingernail. At this time, it was appreciated that the sample sheet regarding the present invention adhered thereto firmly, and thus a base sheet was broken (breakage of the base sheet). In contrast, the sample sheet for comparison was peeled off relatively easily from the interface with the polyethylene film (breakage of the interface). That is, in the sample sheet regarding the present invention, it was confirmed that a definite improvement in adhesion was achieved.

EXAMPLE 10

Out of plasticizers used in the present invention, 7 species which were set forth in Table 3 were chosen. The following materials were then mixed:

| | |
|---|---|
| Solid plasticizer | 50 parts |
| Polyvinyl alcohol | 3 parts |
| Nonionic active agent | 3 parts |

To the resulting mixture, water was added so that a concentration of each plasticizer might be 25%, and the plasticizer was then wet-pulverized to fine particles by the use of a ball mill, thereby preparing an aqueous suspension. Next, the following materials were mixed:

| | |
|---|---|
| Styrene/acrylic ester copolymer | 5.0 parts |
| Vinyl acetate/ethylene copolymer | 5.0 parts |
| Plasticizer suspension | 16 parts |
| Rosin ester | 2.5 parts |

Water was then added thereto so as to prepare an aqueous coating solution of the total solid content concentration being 50%.

An art paper having a basis weight of 80 g/m² was coated on the either surface thereof with each coating solution so that a dry coating weight might be 20 g/m², followed by drying it at room temperature, whereby coated papers which were all non-adhesive were obtained.

These coated papers were then heated for 30 seconds in a thermostatic chamber at 150° C. so as to accomplish its activation, and immediately after the heating, tackiness degrees were evaluated by a finger contact test.

The results are set forth in Table 3. In the compositions containing the novel plasticizers of the present invention, their tackiness was displayed remarkably by the heating.

TABLE 3

Examples of 2-acyloxybenzoates.

| Symbol | Plasticizer | Melting Point | Tackiness |
|---|---|---|---|
| (a) | Methyl 2-acetyloxybenzoate | 50° C. | C |
| (b) | 2-Chloroethyl 2-acetyloxybenzoate | 62° C. | B |
| (f) | Phenyl 2-acetyloxybenzoate | 98° C. | A |
| (j) | Phenyl 2-benzoyloxybenzoate | 84° C. | A |
| (k) | Paratolyl 2-parachlorobenzoyloxybenzoate | 106° C. | B |
| (q) | Para-tert-butylphenyl 2-benzoyloxybenzoate | 119° C. | B |
| (l) | Para-tert-octylphenyl 2-benzoyloxybenzoate | 113° C. | B |
| | Blank | — | D |

Note 1: "Symbol" is indicative of each of symbols attached to the structural formulae of 2-acyloxybenzoates.
Note 2: Higher tackiness ... A>B>C>D ... no tackiness.

EXAMPLE 11

As plasticizers, phenyl 2-benzoyloxybenzoate of the present invention and known cyclohexyl phthalate were chosen, and the same procedure as in Example 10 was repeated in order to prepare thermal delayed tack sheets. They were all activated by heating at 150° C. for 30 seconds, thereby procuring sufficient tackiness and adhesion. For the purpose of inspecting blocking properties between the sheets themselves, the latter were superposed on each other so that the obverse of one sheet might be confronted by the reverse of the other sheet, and a weight of 1 kg/cm² was put thereon. They were allowed to stand at a circumferential temperature of 55° C. for 30 minutes, followed by inspecting the blocking properties.

In the case of the comparative example in which dicyclohexyl phthalate was used as the solid plasticizer, when the adhered sheets were separated, blocking was observed, and in addition a big sound was caused.

On the other hand, as for the example of the present invention in which phenyl 2-benzoyloxybenzoate was used, no blocking was observed in practice and little sound occurred.

That is, in the example of the present invention, it was confirmed that a definite improvement in blocking properties was achieved.

EXAMPLE 12

As plasticizers, 2-para-tert-octylphenyl 2-benzoyloxybenzoate of the present invention and known dicyclohexyl phthalate were chosen, and in the same manner as in Example 10, aqueous suspensions of their fine particles were prepared. Next, the following materials were mixed:

| | |
|---|---|
| Ethylene/vinyl acetate copolymer emulsion | 10 parts |
| Suspension of dicyclohexyl phthalate | 10 parts |
| 2-Para-tert-octyl 2-benzoyloxybenzoate suspension | 5 parts |
| Polyhydric alcohol ester emulsion of polymerized rosin | 5 parts |

To the resulting mixture, water was then added so as to prepare an aqueous coating solution of the total solid content concentration being 50%.

The same procedure as described above was repeated with the exception that 15 parts of dicyclohexyl phthalate alone was employed exclusive of the plasticizer of the present invention, in order to prepare another aqueous coating solution for comparison.

An art paper having a basis weight of 80 g/m² was coated on either surface thereof with each coating solution, and drying was then carried out at 40° C. After drying, the coating weight was 20 g/m² in both the cases.

These sheets were cut into the shape of a strip and were activated by heating at 150° C. for 30 seconds. They were immediately applied onto the wall of a polyethylene bottle and were allowed to stand at room temperature for 2 weeks.

Afterward, the sample sheets were peeled off from the polyethylene bottle by a fingernail.

At this time, the sheet regarding the present invention adhered thereto firmly and the base sheet was broken (base sheet breakage). On the other hand, the comparative sample was relatively easily peeled from the interface with the bottle (interface breakage).

That is, in the example sheet of the present invention, it is apparent that the improvement in adhesion was achieved.

EXAMPLE 13

Out of plasticizers used in the present invention, 6 species were chosen, and the following materials was then mixed:

| | |
|---|---|
| Plasticizer | 50 parts |
| Polyvinyl alchol | 3 parts |
| Nonionic active agent | 3 parts |

To the resulting mixture, water was added so that a concentration of the plasticizer might be 25%, and the plasticizer in the mixture was wet-pulverized to fine particles by the use of a ball mill, thereby preparing an aqueous suspension.

Next, the following materials were mixed:

| | |
|---|---|
| Styrene/acrylic ester copolymer | 5.0 parts |
| Vinyl acetate/ethylene copolymer | 5.0 parts |
| Particle plasticizer suspension | 16 parts |
| Rosin ester | 2.5 parts |

To the resulting mixture, water was added so as to prepare an aqueous coating solution of the total solid content concentration being 50%.

An art paper having a basis weight of 80 g/m² was coated on either surface thereof with each coating solution so that the dry coating weight might be 20 g/m², followed by drying it, whereby coated papers which were all non-adhesive were obtained.

These coated papers were then heated for 30 seconds in a thermostatic chamber at 150° C. so as to accomplish its activation, and immediately after the heating, tackiness degrees were evaluated by a finger contact test.

The results are set forth in Table 4. In the compositions containing the novel plasticizers of the present invention, their tackiness was displayed remarkably by the heating.

TABLE 4
Examples of 2-sulfonyloxybenzoates.

| Symbol | Plasticizer | Melting Point | Tackiness |
|---|---|---|---|
| (b) | Methyl 2-benzensulfonyloxy-benzoate | 42.0° C. | B |
| (e) | Phenyl 2-benzensulfonyloxy-benzoate | 81.5° C. | A |
| (f) | Phenyl 2-paratoluenesulfonyloxy-benzoate | 82.5° C. | B |
| (g) | Phenyl 2-paraethylbenzenesulfonyl-oxybenzoate | 74.0° C. | A |
| (h) | Phenyl 2-paraxylenesulfonyloxy-benzoate | 93.0° C. | B |
| (i) | Phenyl 2-parachlorobenzenesulfonyloxybenzoate | 79° C. | C |
| Blank | | — | D |

Note 1: "Symbol" is indicative of each of symbols attached to the structural formulae of 2-sulfonyloxybenzoates.
Note 2: Higher tackiness . . . A>B>C>D . . . lower tackiness.

EXAMPLE 14

As solid plasticizers, phenyl 2-benzenesulfonyloxybenzoate and known dicyclohexyl phthalate were chosen, and the same procedure as in Example 13 was repeated in order to prepare thermal delayed tack sheets. They were all activated by heating at 150° C. for 30 seconds, thereby procuring sufficient adhesion and tackiness.

For the purpose of inspecting blocking properties between the sheets themselves, the coated sheets were superposed on each other so that the obverse of one sheet might be confronted by the reverse of the other sheet, and a weight of 1 kg/cm$^2$ was put thereon. They were allowed to stand at a circumferential temperature of 55° C. for 30 minutes, followed by inspecting the blocking properties.

In the case of the comparative example in which dicyclohexyl phthalate was used as the solid plasticizer, when the adhered sheets were separated off, the blocking was observed, and in addition a big sound was caused.

On the other hand, as for the example of the present invention, no blocking was observed in practice and little sound occurred.

That is, in the example of the present invention, it was confirmed that the definite improvement in blocking properties was achieved.

EXAMPLE 15

As plasticizers, phenyl 2-paraethylbenzenesulfonyloxybenzoate and known dicyclohexyl phthalate were chosen, and aqueous suspensions of their fine particles were then prepared in the same procedure as in Example 13. Next, the following materials were mixed:

| | |
|---|---|
| Ethylene/vinyl acetate copolymer emulsion | 10 parts |
| Phenyl 2-paraethylbenzenesulfonyloxybenzoate suspension | 5 parts |
| Dicyclohexyl phthalate suspension | 10 parts |
| Polyhydric alcohol ester emulsion of polymerized rosin | 5 parts |

To the resulting mixture, water was added so as to prepare an aqueous coating solution of the total solid content concentration being 50%.

The same procedure as described above was repeated with the exception that 15 parts of dicyclohexyl phthalate alone was employed exclusive of the plasticizer of the present invention, in order to prepare another aqueous coating solution for comparison.

An art paper having a basis weight of 80 g/m$^2$ was coated on the either surface thereof with each coating solution, and drying was then carried out at 40° C. After the drying, a coating weight was 20 g/m$^2$ in both the cases.

These sheets were cut into the shape of a strip and were activated by heating at 150° C. for 30 seconds. They were immediately applied onto the wall of a polyethylene bottle and were allowed to stand at room temperature for 2 weeks.

Afterward, the sample sheets were peeled off from the polyethylene bottle by a fingernail.

At this time, the sample sheet regarding the present invention adhered thereto firmly and the base sheet was broken (base sheet breakage). On the other hand, the comparative sample sheet was relatively easily peeled from the interface with the bottle (interface breakage).

That is, in the example sheet of the present invention, it is apparent that the improvement in adhesion was achieved.

In a different embodiment, it has now been found that where polyurethane is used as the adhesive polymer, suitable compositions may be obtained using conventional solid plasticizers such as diphenyl phthalate, dihexyl phthalate, dicyclohexyl phthalate, dihydroabietyl phthalate, dimethyl isophthalate, sucrose benzoate, ethylene glycol dibenzoate, trimethylolethane tribenzoate, glyceride tribenzoate, pentaerythritol tetrabenzoate, sucrose octaacetate, tricyclohexyl citrate, N-cyclohexyl-p-toluenesulfonamide, dehydroabietylamine carbonate and methoxyethyl stearate/urea complex.

The following examples are taken from commonly owned Japanese patent application No. 083326/86 filed April 10, 1986, the disclosure of which is incorporated by reference herein in its entirety.

EXAMPLE 16

The following raw materials were blended to prepare an aqueous coating solution (solid content=50%):

| | |
|---|---|
| Polyurethane emulsion (trade name Izerax S-1020; Hodogaya Chemical Co., Ltd.) | 100 parts |
| Rosin ester emulsion | 50 parts |
| Dicyclohexyl phthalate aq. dispersion | 100 parts |

An art paper having a basis weight of 80 g/m$^2$ was coated on either surface thereof with the thus prepared aqueous coating solution so that a dry coating weight might be 15 g/m$^2$, followed by drying at 50° C. for 2 minutes in order to prepare a non-adhesive coated paper.

EXAMPLE 17

The following raw materials were blended to prepare an aqueous coating solution (solid content=50%):

| | |
|---|---|
| Polyurethane emulsion (the same as in Example 16) | 60 parts |
| Styrene/acrylic ester copolymer emulsion | 40 parts |
| Polymerized rosin ester emulsion | 30 parts |
| Dicyclohexyl phthalate aq. dispersion | 150 parts |

An art paper having a basis weight of 80 g/m² was coated on either surface thereof with the thus prepared aqueous coating solution so that a dry coating weight might be 20 g/m², followed by drying at 50° C. for 2 minutes in order to prepare a non-adhesive coated paper.

COMPARATIVE EXAMPLE 3

The following raw materials were blended to prepare an aqueous coating solution (solid content=50%):

| | |
|---|---|
| Styrene/acrylic ester copolymer emulsion (the same as in Example 17) | 100 parts |
| Polymerized rosin ester emulsion | 30 parts |
| Dicyclohexyl phthalate aq. dispersion | 150 parts |

An art paper having a basis weight of 80 g/m² was coated on either surface thereof with the thus prepared aqueous coating solution so that a dry coating weight might be 20 g/m², followed by drying at 50° C. for 2 minutes in order to prepare a non-adhesive coated paper.

EXAMPLE 18

The coated papers prepared in Examples 16 and 17 and Comparative Example 3 were activated under heating conditions at 120° C. for 30 seconds, and were applied onto the wall of a polypropylene bottle. The latter onto which the respective papers were applied was allowed to stand at room temperature for a period of one week, and a peel test was then carried out. According to the obtained results, the applied samples of the coated papers in Examples 16 and 17 showed strong tack and adhesive properties, but the applied sample of the coated paper in Comparative Example 3 was peeled easily from the bottle.

COMPARATIVE EXAMPLE 4

The following raw materials were dissolved in 200 parts of toluene:

| | |
|---|---|
| Styrene/isoprene copolymer | 100 parts |
| Terpene resin | 30 parts |
| Dicyclohexyl phthalate | 200 parts |

An art paper having a basis weight of 80 g/m² was coated on either surface thereof with the resulting coating solution so that a dry coating weight might be 20 g/m², followed by drying at 100° C. for 2 minutes in order to prepare a coated paper. However, the coated surface of this paper was too adhesive, and therefore, the paper caused blocking completely, when stacked.

According to the present invention, the thermal delayed tack sheets can be provided which are manufactured by coating the base sheets with the thermal delayed tack composition basically containing the adhesive polymer (A) and the solid plasticizer (B), and preferably additionally containing the tackifier (C). In the foresaid solid plasticizer, each compound represented by the general formula (I) is dispersed in the form of fine particles. In consequence, the present invention can acquire the following effective characterstics which are most important in practice:

(1) To heighten the adhesive and tackiness retention properties of the thermal delayed tack composition and to prolong its activity retention time.

(2) To display the good adhesion and tackiness properties even to articles made from materials having low polarity such as plastic materials.

(3) To inhibit the blocking phenomenon, even when the tack sheets are wound immediately after the coating operation in manufacturing them, and to prevent the blocking trouble, even while the tack sheets are stored in a wound roll-like form or stacked.

Further, in the case that a polyurethane is substituted for a portion or all of the adhesive polymer, the functional effects of the preceding paragraphs (1), (2) and (3) can be enhanced.

In order to obtain the additionally heightened effect of preventing the blocking phenomenon from occurring in manufacturing the tack sheets, it can be recommended that the above mentioned components (A) and (C) are used in the form of the aqueous emulsion and the component (C) in the form of the aqueous suspension.

The present invention is a practically valuable invention by which such fundamental problems of the thermal delayed tack sheets as described above can be solved.

What is claimed is:

1. A thermal delayed tack sheet comprising a base sheet coated with a thermal delayed tack composition, said composition comprising (A) an adhesive polymer and (B) a solid plasticizer, wherein said solid plasticizer comprises fine particles of at least one compound having the following general formula (I):

   $$R_1\text{-}O\text{-}\Phi\text{-}R_2 \qquad (I)$$

wherein $\Phi$ is a benzene ring or a naphthalene ring which may have a substituent;

wherein $R_1$ is selected from the group consisting of hydrogen, acryl, alkylsulphonyl, and benzene sulphonyl which may have a substituent on the benzene ring thereof;

$R_2$ is seleclted from the group consisting of $-O-CO-R_3$ or $CO-O-R_3$;

wherein $R_3$ is selected from the group consisting of alkyl, alkenyl, aralkyl, aralkenyl and aryl, with the proviso that when $R_1$ is hydrogen, positions 1 and 2, 1 and 3, or 1 and 4 on said $\Phi$ may be substituted by $-O-R_1$, and $R_2$, and where $R_1$ is acryl, alkylsulfonyl or benzenesulfonyl, the positions 1 and 2 on the ring are substituted.

2. A thermal delayed tack sheet comprising a base sheet coated with a thermal delayed tack composition, said composition comprising (A) an adhesive polymer and (B) a solid plasticizer, wherein said solid plasticizer comprises fine particles of at least one compound having the following general formula (II);

   $$HO\text{-}\Phi\text{-}COOR_4 \qquad (II)$$

wherein Φ is a benzene ring or a naphthalene ring which may have a substituent, and R₄ is selected from the group consisting of alkyl, cycloalkyl, alkenyl, aralkyl whose aromatic ring may have a substituent, and phenyl.

3. The thermal delayed tack sheet of claim 2, wherein said plasticizer comprises one or more compounds selected from the group consisting of: phenyl salicylate, methyl metahydroxybenzoate, ethyl metahydroxybenzoate, phenyl metahydroxybenzoate, methyl parahydroxybenzoate, ethyl parahydroxybenzoate, n-propyl parahydroxybenzoate, isopropyl parahydroxybenzoate, n-butyl parahydroxybenzoate, isobutyl parahydroxybenzoate, sec-butyl parahydroxybe nzoate, n-heptyl parahydroxybenzoate stearyl parahydroxybenzoate, cyclohexyl parahydroxybenzoate, allyl parahydroxybenzoate, benzyl parahydroxybenzoate, β-phenylethyl parahydroxybenzoate, 4-chlorobenzyl parahydroxybenzoate, 4-methylbenzyl parahydroxybenzoate, phenyl 1-hydroxy-2-naphthoate, methyl 2-hydroxy-3-naphthoate, ethyl 2-hydroxy-3-naphthoate, phenyl 2-hydroxy-3-napthoate, dimethyl 4-hydroxyphthalate, diethyl 4-hydroxyphthalate, di-n-propyl 4-hydroxyphthalate, diisopropyl 4-hydroxyphthalate, dibenzyl 4-hydroxyphthalate, dicyclohexyl 4-hydroxyphthalate, dimethyl 2-hydroxyisophthalate, diethyl 2-hydroxyisophthalate, diphenyl 2-hydroxyisophthalate, dimethyl 4-hydroxyisophthalate, diethyl 4-hydroxyisophthalate, diethyl 5-hydroxyisophthalate and dimethyl hydroxyterephthalate.

4. A thermal delayed tack sheet comprising a base sheet coated with a thermal delayed tack composition, said composition comprising (A) an adhesive polymer and (B) a solid plasticizer,
wherein said solid plasticizer comprises fine particles of one or more compounds which are solid at room temperature and which have the following structural formula III:

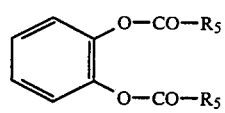
(III)

wherein R₅ is selected from the group consisting of alkyl, cycloalkyl, alkenyl, aralkyl, aralkenyl, haloalkyl, and aryl.

5. The thermal delayed tack sheet of claim 4 wherein said solid plasticizer comprises one or more compounds selected from the group consisting of catechol diacetate, catechol dilaurate, catechol dimyristate, catechol distearate, catechol dieicosanic acid ester, catechol dicyclohexane carboxylate, catechol diebenzoate, catechol diphenolacetate, and catechol dicinnamate.

6. A thermal delayed tack sheet comprising a base sheet coated with a thermal delayed tack composition, said composition comprising (A) an adhesive polymer and (B) a solid plasticizer,
wherein said solid plasticizer comprises fine particles of one or more compounds which are solid at room temperature which are represented by the following structural formula (IV):

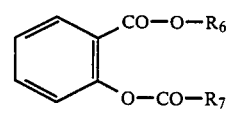
(IV)

wherein R₆ and R₇ are selected from the group consisting of alkyl, cycloalkyl, alkenyl, aralkyl whose aromatic ring may also have a substituent, and aryl whose aromatic ring may also have a substituent; and wherein the main aromatic ring may also have a substituent selected from the group consisting of alkyl, aryl, and halogen.

7. The thermal delayed tack sheet of claim 6, wherein said solid plasticizer is selected from the group consisting of the following chemical structural formula:

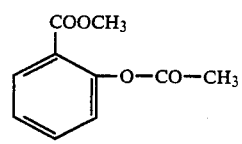
(a)

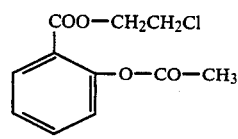
(b)

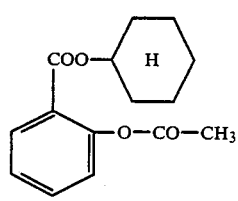
(c)

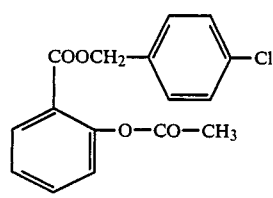
(d)

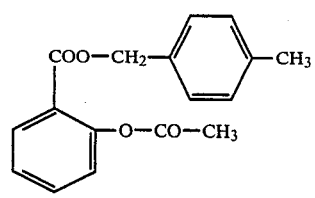
(e)

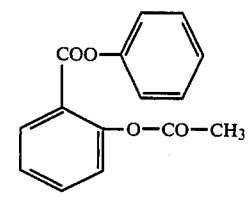
(f)

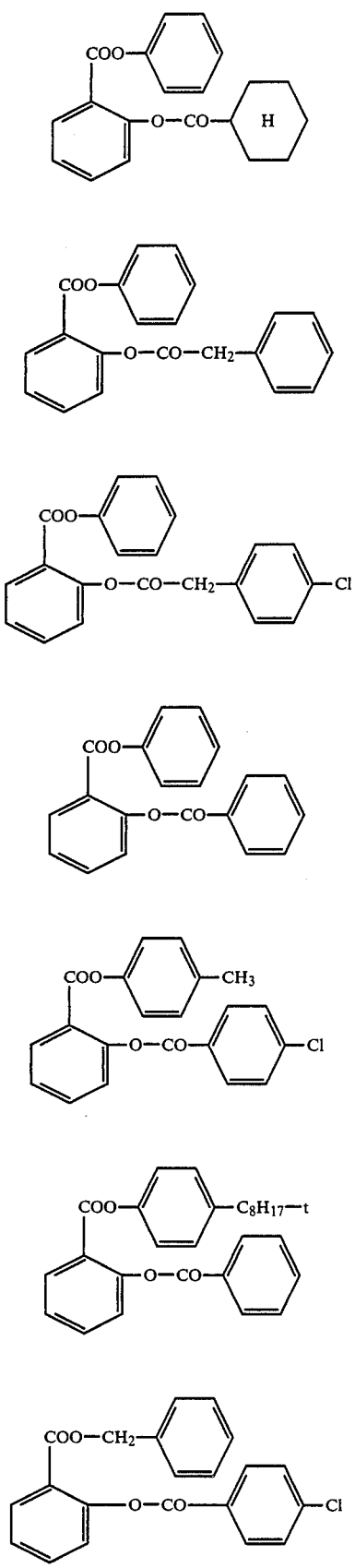
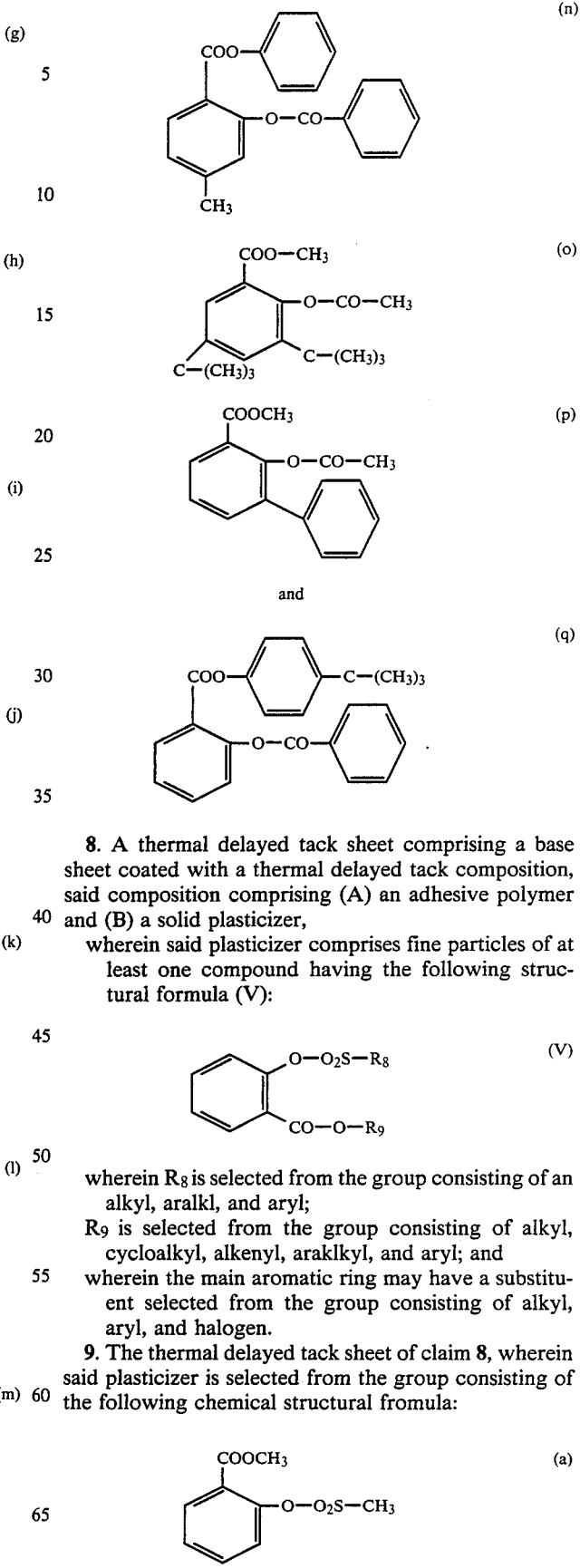

8. A thermal delayed tack sheet comprising a base sheet coated with a thermal delayed tack composition, said composition comprising (A) an adhesive polymer and (B) a solid plasticizer, wherein said plasticizer comprises fine particles of at least one compound having the following structural formula (V):

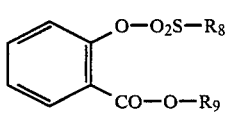

wherein $R_8$ is selected from the group consisting of an alkyl, aralkl, and aryl;

$R_9$ is selected from the group consisting of alkyl, cycloalkyl, alkenyl, araklkyl, and aryl; and wherein the main aromatic ring may have a substituent selected from the group consisting of alkyl, aryl, and halogen.

9. The thermal delayed tack sheet of claim 8, wherein said plasticizer is selected from the group consisting of the following chemical structural fromula:

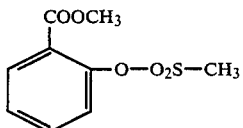

-continued

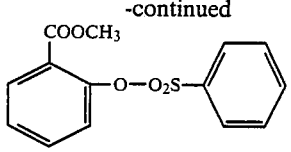 (b)

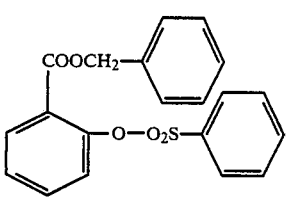 (c)

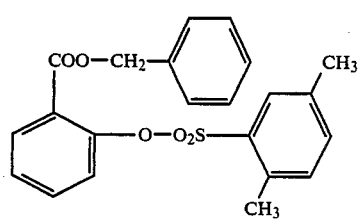 (d)

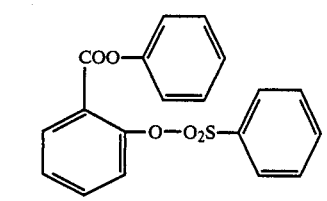 (e)

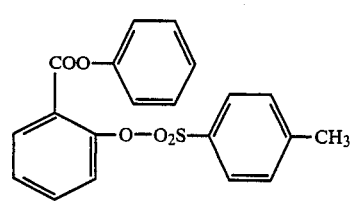 (f)

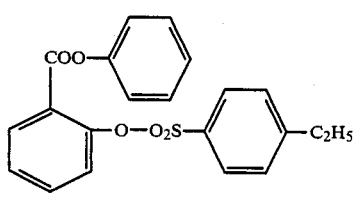 (g)

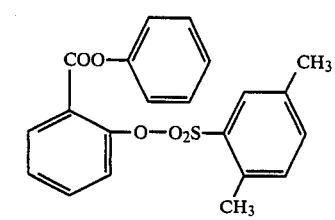 (h)

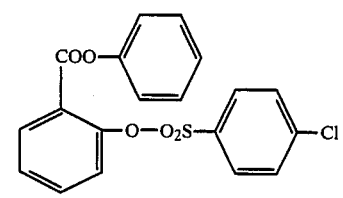 (i)

-continued

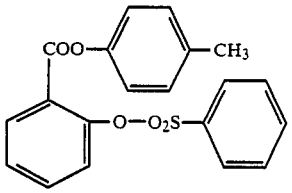 (j)

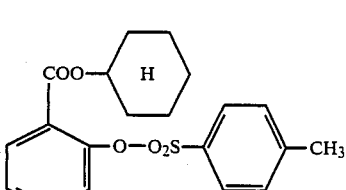 (k)

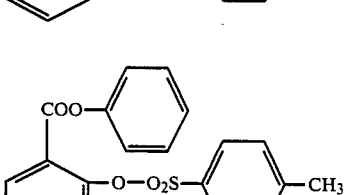 (l)

 (m)

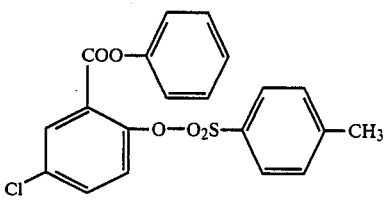 (n)

and

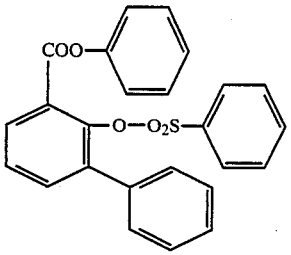 (o)

10. The thermal delayed tack sheet as in anyone of claim 1-9, wherein said adhesive polymer (A) is present at 100 parts by weight and said solid plasticizer (B) is present at 50-300 parts by weight.

11. The thermal delayed tack sheet of claim 10, further comprising (C) a tackifier.

12. The thermal delayed tack sheet of claim 11, wherein said tackifier (C) is present at 10-120 parts by weight.

13. The thermal delayed tack sheet as in any one of claims 1-9, wherein said adhesive polymer (A) comprises a polyurethane at 50-100% by weight.

14. The thermal delayed tack sheet of claim 13, wherein said thermal delayed tack composition is applied as an aqueous dispersion.

15. A thermal delayed tack sheet comprising a base sheet coated with a thermal delayed tack composition comprising (A) an adhesive polymer, (B) a solid plasticizer (B), and (C) a tackifier, wherein said adhesive polymer comprises polyurethane and said plasticizer is selected from the group consisting of diphenyl phthalate, dihexylphthalate, dicyclohexylphthalate, dihydroabietyl phthalate, dimethyl isophthalate, sucrose benzoate, ethylene glycol dibenzoate, trimethylolethane tribenzoate, glyceride, tribenzoate, pentaerylthritol tetrabenzoate, sucrose octaacetate, tricyclohexyl citrate, N-cyclohexyl-p-toluenesulphonamide, dehydroabietylamine carbonate, and methoxyethyl stearate/urea complex.

* * * * *